Patented Mar. 2, 1948

2,436,851

UNITED STATES PATENT OFFICE 2,436,851

BICYCLIC SULFUR COMPOUNDS AND PROCESS FOR THE MANUFACTURE THEREOF

Albert Businger, Basel, Switzerland, assignor to Hoffmann-La Roche Inc., Nutley, N. J., a corporation of New Jersey No Drawing. Application April 10, 1944, Serial No. 530,402. In Switzerland May 6, 1943

12 Claims. (Cl. 260—309)

My invention relates to new bicyclic sulfur compounds of the formula

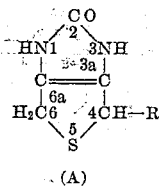 or 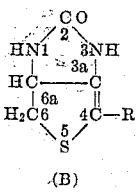

(A)                (B)

The substituent R in position 4 may be selected from a wide group of organic radicals. The substituent R may correspond to substituent R in the following class of starting materials which is employed in the synthesis. The starting materials are thio-ethers of 5-mercaptomethyl-hydantoine of the formula

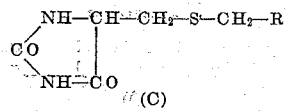

(C)

The substituent R in Formula C is one which exerts an activating effect upon the adjacent methylene group. Such substituents may be, for example, —COOH, —CN, —CO alkyl, —CO substituted-alkyl such as —CO carboxyalkyl,

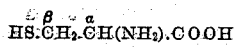

The said bicyclic sulfur compounds may be considered as derivatives of α-amino-β-thiolpropionic acid. The formula for this acid is represented by:

$$HS.CH_2.CH(NH_2).COOH$$

Various such derivatives have already been prepared. Thus, for instance, the corresponding carboxymethyl-thioether is known (Journal of Biological Chemistry, vol. 106, year 1934, page 340). The formula for this thioether is represented by:

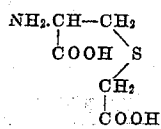

Furthermore, a derivative of dithio-α,α'-diaminodipropionic acid, the amino-groups of which are transformed into the ureides and subsequently into the hydantoines, has been described (Journal of the American Chemical Society, vol. 56, year 1934, page 1421; The Biochemical Journal, vol. 27, II, year 1933, page 1838). However, no derivatives of α-amino-β-thiolpropionic acid carrying an etherified thio-group as well as an amino-group converted into the hydantoine have hitherto become known; the bicyclic sulfur compounds according to my invention are consequently new.

According to the process described in the present specification, thio-ethers of 5-mercaptomethyl-hydantoine must be used as starting materials. These compounds unknown in literature so far, may be prepared from β-mercapto-α-amino-propionic acid or from β-mercapto-α-ureido-propionic acid by first etherifying the mercapto-group with omega-halogen compounds, if necessary converting the amino-group into the ureido-group, and then closing the hydantoine-ring between the ureido-group, on the one hand, and the carboxyl-group, on the other hand.

The reaction scheme is represented as follows:

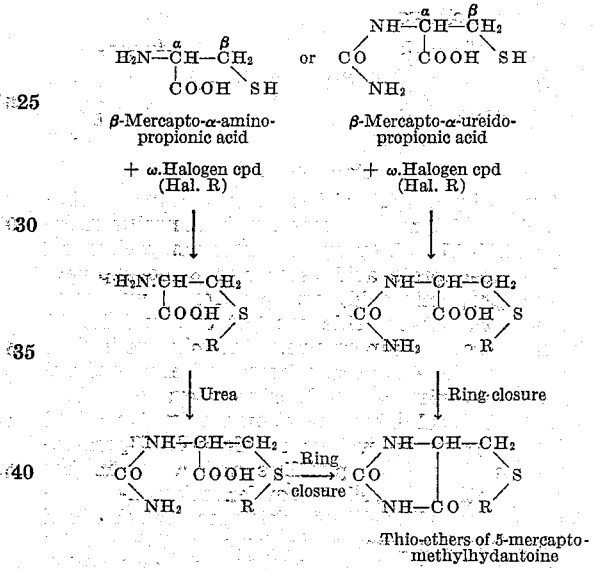

Thio-ethers of 5-mercaptomethylhydantoine

I have found that the new bicyclic sulfur compounds can be obtained by treating with a condensing agent, facilitating the splitting off of water, thio-ethers of 5-mercaptomethyl-hydantoine of the general formula

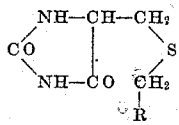

The substituent which is not changed during the reaction may be selected from a wide group of organic radicals. It is, however, essential that the substituent R exert an activating effect upon the adjacent methylene-group; thus, the radicals —COOH, —CN, —COX and

(X standing for alkyl and substituted alkyl radicals) are particularly suitable. Practically any condensing agent facilitating the splitting off of water may be used for the purposes of the present invention, for instance concentrated sulfuric acid or phosphorus-oxychloride. The reaction sets in at room temperature more readily, however, upon warming.

It is surprising that the reaction described takes place, since it was to be expected that the oxo-group of hydantoine, as carbonyl-group of an acid-amide, would be particularly slow to react.

The new compounds obtained in accordance with the process described, for which the formulae have been recited at the beginning of the specification, are useful as intermediate products for the manufacture of growth-promoting substances having the action of biotine.

Example 1

1 part by weight of carboxymethyl-thioether of 5-mercapto-methyl-hydantoine (prepared from β-mercapto-α-ureido-propionic acid and chloroacetic acid) and 7 parts by weight of phosphorus-oxychloride are heated for two hours on a steam-bath. Excessive phosphorus-oxychloride is thereupon evaporated. For the purpose of separating phosphoric acid, the residue is twice recrystallised from 7 parts of water under addition of a little animal-charcoal. The bicyclic condensation product crystallises in platelike crystals melting at 202–204° C.

The reaction of this example may be represented as follows:

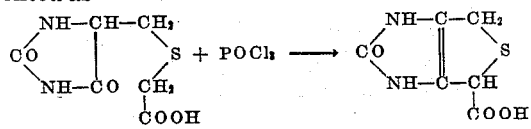

Example 2

1 part by weight of 5-carboxy-pentanone(2)-thioether of 5-mercaptomethyl-hydantoine melting at 171–172° C. (prepared from omega-bromo-delta-oxo-caproic acid ester and β-mercapto-α-amino-propionic acid) and 5 parts by weight of phosphorus-oxychloride are left to stand for 12 hours at room temperature. The mixture is then heated to 50° C. for one hour. Thereupon, excessive phosphorus-oxychloride is evaporated in vacuo. The solid, brown-yellow residue is washed with 20 parts by weight of alcohol. Upon recrystallisation from pyridine and water in the first fraction a yellow condensation 2-substituted-3,4-ureyline-dihydrothiopene is obtained which has the summation formula $C_{10}H_{10}O_3N_2S$ and a melting point of 338–342° C., and which possesses the following formula the 2-substituent being a lactone:

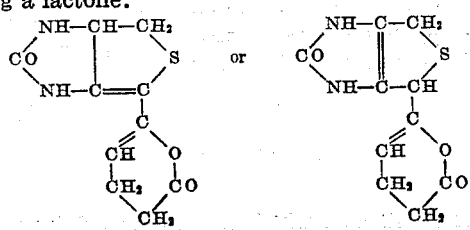

The reaction of this example may be represented as follows:

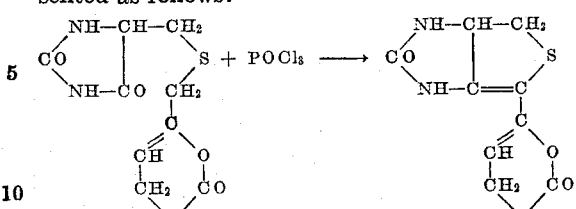

and

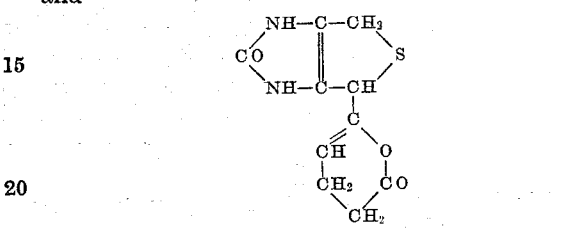

As second fraction, there results the free oxo acid $C_{10}H_{12}O_4N_2S$ in colorless crystals melting at 196–198° C. and having the following formula:

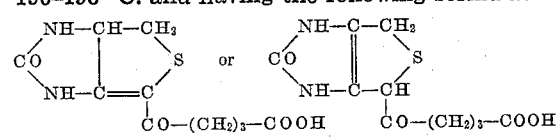

The formula for the hydantoine starting material is represented by

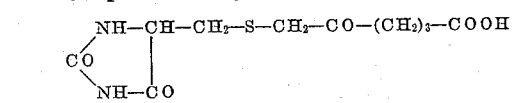

Example 3

1 part by weight of 5-carboxy-pentanone(2)-thioether of 5-mercaptomethyl-hydantoine is heated with 5 parts by weight of concentrated sulfuric acid for 10 minutes to 50° C. On diluting with ice, a yellow powder precipitates, which is identical with the crude condensation product of Example 2.

I claim:

1. A bicyclic sulfur compound of the formula selected from the group consisting of

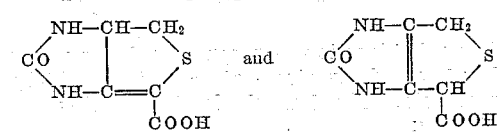

2. A bicyclic sulfur compound of the formula selected from the group consisting of

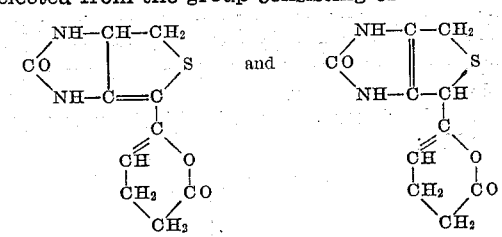

3. A bicyclic sulfur compound of the formula selected from the group consisting of

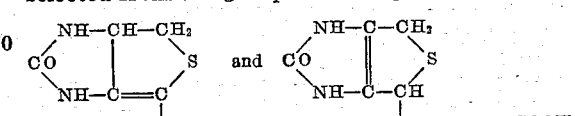

4. Process for the manufacture of a bicyclic sulfur compound of the formula selected from the group consisting of

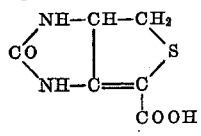 and 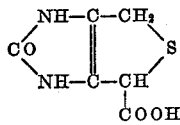

comprising treating carboxymethyl-thioether of 5-mercaptomethyl-hydantoine with a dehydrating condensing agent.

5. Process for the manufacture of a bicyclic sulfur compound of the formula selected from the group consisting of

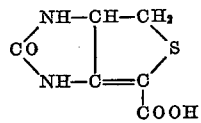 and 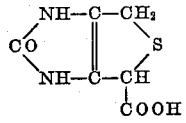

comprising treating carboxymethyl-thioether of 5-mercaptomethyl-hydantoine with phosphorus-oxychloride.

6. Process for the manufacture of a bicyclic sulfur compound of the formula selected from the group consisting of

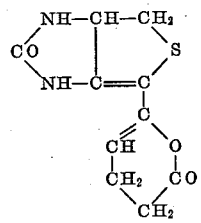 and 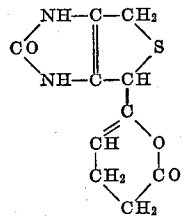

comprising treating 5-carboxy-pentanone(2)-thioether of 5-mercaptomethyl-hydantoine with a dehydrating condensing agent and isolating the bicyclic sulfur compound by fractional crystallisation.

7. Process for the manufacture of a bicyclic sulfur compound of the formula selected from the group consisting of

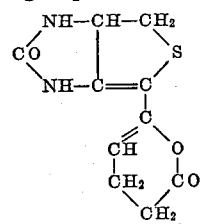 and 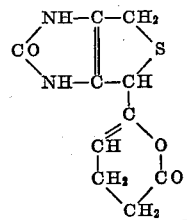

comprising treating 5-carboxy-pentanone(2)-thioether of 5-mercaptomethyl-hydantoine with phosphorus-oxychloride and isolating the bicyclic sulfur compound by fractional crystallisation.

8. Process for the manufacture of a bicyclic sulfur compound of the formula selected from the group consisting of

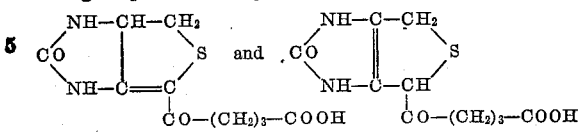

comprising treating 5-carboxy-pentanone(2)-thioether of 5-mercaptomethyl-hydantoine with a dehydrating condensing agent and isolating the bicyclic sulfur compound from the mother liquor of fractional crystallisation.

9. Process for the manufacture of a bicyclic sulfur compound of the formula selected from the group consisting of

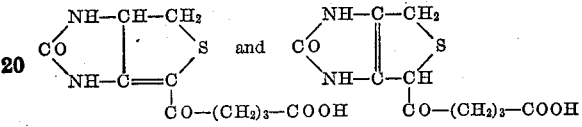

comprising treating 5-carboxy-pentanone(2)-thioether of 5-mercaptomethyl-hydantoine with concentrated sulfuric acid and isolating the bicyclic sulfur compound from the mother liquor of fractional crystallisation.

10. 2 - substituted - 3,4 - ureyline-dihydrothiophenes the 2-substituent being a member of the group consisting of —COOH, —CN, —CO alkyl, —CO carboxyalkyl and the lactone thereof.

11. Process for the manufacture of 2-substituted-3,4-ureyline-dihydrothiophenes, the 2-substituent being a member of the group consisting of —COOH, —CN, —CO alkyl, —CO carboxyalkyl and the lactone thereof, which comprises treating an activated methylene thio-ether of 5-mercaptomethyl-hydantoine with a dehydrating condensing agent.

12. Process for the manufacture of 2-substituted-3,4-ureyline-dihydrothiophenes, the 2-substituent being a member of the group consisting of —COOH, —CN, —CO alkyl, —CO carboxyalkyl and the lactone thereof, which comprises treating an activated methylene thio-ether of 5-mercaptomethyl-hydantoine with phosphorus-oxychloride.

ALBERT BUSINGER.

REFERENCES CITED

The following references are of record in the file of this patent:

Science, November 20, 1942, pages 455–461.